US009789843B1

(12) United States Patent
Hui

(10) Patent No.: US 9,789,843 B1
(45) Date of Patent: Oct. 17, 2017

(54) UNSCREWABLE AND MAGNETICALLY ATTRACTABLE INFLATOR CAP

(71) Applicant: David Hui, Taipei (TW)

(72) Inventor: David Hui, Taipei (TW)

( * ) Notice: Subject to any disclaimer, the term of this patent is extended or adjusted under 35 U.S.C. 154(b) by 0 days.

(21) Appl. No.: 15/136,978

(22) Filed: Apr. 24, 2016

(51) Int. Cl.
  *F16L 55/10* (2006.01)
  *B60R 21/26* (2011.01)
  *H01F 7/02* (2006.01)

(52) U.S. Cl.
  CPC ............. *B60R 21/26* (2013.01); *H01F 7/021* (2013.01); *H01F 7/0221* (2013.01); *F16L 55/10* (2013.01)

(58) Field of Classification Search
  CPC .............................. B60C 29/06; B60C 29/066
  USPC ........................ 138/89.1–89.4, 96 R; 220/230
  See application file for complete search history.

(56) References Cited

U.S. PATENT DOCUMENTS

| 1,190,866 | A | * | 7/1916 | Crawford | B60C 29/06 138/89.3 |
| 1,254,975 | A | * | 1/1918 | Brown | B60C 29/06 138/89 |
| 1,489,364 | A | * | 4/1924 | Schweinert | B60C 29/06 138/89.3 |
| 1,621,300 | A | * | 3/1927 | Woolsey | B60C 29/06 138/89.3 |
| 1,654,178 | A | * | 12/1927 | Darr | B60C 29/06 137/233 |
| 2,248,450 | A | * | 7/1941 | Eger | F16K 15/20 138/89.3 |
| 3,112,770 | A | * | 12/1963 | Howard | B60C 25/18 138/89.2 |
| 6,102,064 | A | * | 8/2000 | Robinson | B60C 29/06 137/232 |
| 6,279,600 | B1 | * | 8/2001 | Robinson | B60C 29/06 137/232 |
| 6,382,450 | B1 | * | 5/2002 | De Rosa | B65D 41/02 206/818 |
| 7,610,937 | B1 | * | 11/2009 | Trimble | F16K 27/08 138/89 |
| 7,770,601 | B2 | * | 8/2010 | Perry | B60C 29/06 137/232 |
| 8,960,238 | B2 | * | 2/2015 | Schomann | B60C 29/066 138/89.3 |

FOREIGN PATENT DOCUMENTS

GB 2526841 A * 12/2015 ........... B60C 29/066

* cited by examiner

*Primary Examiner* — Patrick F Brinson

(57) ABSTRACT

An inflator cap comprising: an outer cover; an anti-corrosion lining formed in or inside the outer cover; and a magnetic member formed on, in or inside the outer cover, whereby the magnetic member of the inflator cap, once unscrewed from the inflator, will be magnetically attractable on a ferromagnetic object to prevent its loss; or whereby the anti-corrosion lining will preclude a direct contact between the outer cover of the inflator cap and a valve stem of the inflator to prevent from sticking of the oxide of the outer cover once oxidized on the valve stem of the inflator, thereby smoothly unscrewing the cap from the inflator.

2 Claims, 2 Drawing Sheets

UNSCREWABLE AND MAGNETICALLY ATTRACTABLE INFLATOR CAP

BACKGROUND OF THE INVENTION

A conventional inflator cap as covered on a vehicle inflator is made of copper. The copper inflator cap is heavy and also expensive. So, the copper inflator cap has been gradually replaced by aluminum-alloy cap. However, after a long time service, the aluminum will be oxidized to form an oxide layer which may be stuck up among the threads of the inflator cap and the valve stem of the inflator, to thereby "lock" the cap and being unable to unscrew from the inflator for inflating tire or maintenance.

The present inventor has therefore invented the inflator cap which is easily unscrewable from the inflator.

Meanwhile, a conventional inflator cap, once unscrewed from the inflator, may be easily lost as lacking of any holding mechanism for temporarily holding the cap thereon.

It is therefore invented by the present inventor to disclose an inflator cap, which may be magnetically holdable or attractable on a ferromagnetic object to prevent loss.

SUMMARY OF THE INVENTION

The object of the present invention is to provide an inflator cap comprising: an outer cover; an anti-corrosion lining formed in or inside the outer cover; and a magnetic member formed on, in or inside the outer cover, whereby the magnetic member of the inflator cap, once unscrewed from the inflator, will be magnetically holdable or attractable on a ferromagnetic object or frame to prevent its loss; or whereby the anti-corrosion lining will form a partition to prevent from a contact between the outer cover of the inflator cap and a valve stem of the inflator to prevent from sticking of the oxide of the outer cover once oxidized, thereby smoothly unscrewing the cap from the inflator.

DETAILED DESCRIPTION

Figure 1:
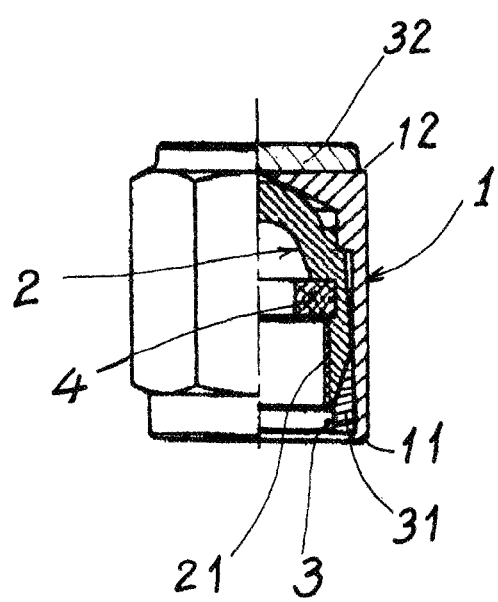
FIG. 1 is a partial sectional drawing of a first preferred embodiment of the present invention.

As shown in FIG. 1, an inflator cap of the present invention comprises: an outer cover 1; an anti-corrosion lining 2, a magnetic member 3, and a sealing ring or packing ring 4.

The outer cover 1 may be made of aluminum alloy or other materials, not limited in the present invention.

The anti-corrosion lining 2 is made of plastic, rubber, or other composite materials, which are resistant to corrosion. The lining 2 is formed, lined, embedded or fixed inside the cover 1.

The anti-corrosion lining 2 includes female threads 21 formed therein to be engaged with male threads (not shown) formed on an inflator valve stem so that the cap of the present invention can be screwed on the inflator stem or unscrewed from the inflator.

The magnetic member 3 may be selected from a magnet, a magnetic adhesive element having magnetic adhesive or magnetic powders or ingredients formed in an adhesive composition, or any other member having magnetism capable of attracting the magnetic member and the inflator cap of the present invention on a ferromagnetic object, frame or device.

The magnetic member 3 includes a magnetic adhesive element 31 having magnetic adhesive composition contained therein and is packed in between a lower rim portion 11 of the outer cover 1 and a lower periphery of the anti-corrosion lining 2 as shown in FIG. 1. Such a magnetic adhesive element 31 plays double roles, both for providing magnetism of the inflator cap to be magnetically attracted or held on a ferromagnetic abject such as an ironic vehicle body or frame; and also for firmly fastening the anti-corrosion lining 2 within the outer cover 1 to prevent from loosening or releasing of the lining 2 from the cover 1.

The magnetic adhesive used in the present invention may include strontium ferrite magnetic powder and polyolefin resin base adhesive. Other compositions may be selected for preparing the magnetic adhesive element, not limited in the present invention.

The magnetic member 3 may also include a magnetic disk 32 secured on a top portion 12 of the outer cover 1. Such a magnetic disk 32 may be covered or coated with a corrosion-proof layer (not shown) for further protection of the magnetic disk 32.

The magnetic member 3 may be secured, formed or fastened on, in or inside any position of the outer cover 1.

The inflator cap, comprised of the outer cover 1 and the anti-corrosion lining 2, may be fastened to a valve stem (not shown) of an inflator as packed by a packing ring or sealing ring 4.

Figure 2:
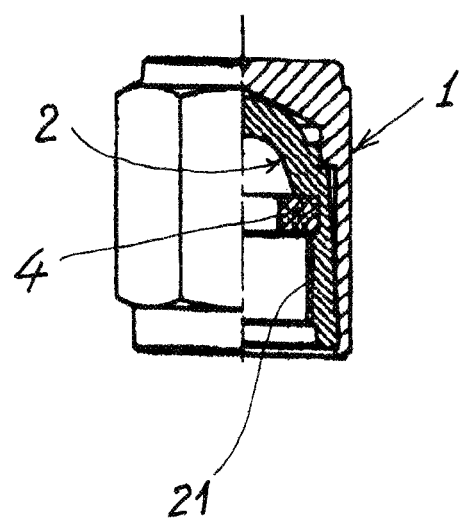
FIG. 2 shows a second preferred embodiment of the present invention as simplified from FIG. 1.

As shown in FIG. 2, the magnetic member 3 is omitted, and the anti-corrosion lining 2 may be made as a magnetic lining by incorporating magnetic powder therein for providing both lining property and magnetism simultaneously. The magnetic powder may be selected from: ferrite, NdFeB (Neodymium Iron Boron) and SmCo (Samarium Cobalt), or other magnetic powders.

For production option and cost reason, the anti-corrosion lining 2 may not be incorporated with magnetic powders or ingredients therein. By the way, the inflator cap thus made will exclude the magnetism property. However, the anti-corrosion lining 2 may still protect the cap from being stuck to the inflator valve stem due to oxidation after long time service.

The present invention provides an inflator cap with the following advantages:

1. The anti-corrosion lining 2 may protect the cap from being oxidized, and prevent from sticking of the cap on an inflator valve stem, to ensure a smooth unscrewing of the cap for inflating or maintenance.
2. The cap may be magnetically held or attracted on any ferromagnetic or iron frame, structure, object or stand so that it may not be lost.

The present invention may include one or plural magnetic members 3 formed or secured on, in or inside any location on the outer cover 1.

The magnetic member 3 may be formed with plural shapes including: disk, plate, ring, strip, band, and any other shapes, not limited in the present invention.

The outer cover 1 may also be made as magnetic so that it may be directly magnetically attractable or holdable on any ironic or ferromagnetic object or device.

The lining 2 and the cover 1 may also be integrally formed as an inflator cap, not limited in the present invention.

The inflator cap may be shaped as cylindrical or hexagonal or any other shapes.

The present invention may be further modified without departing from the spirit and scope of the present invention. For instance, the cover 1 may be made as magnetic, having an anti-corrosion portion formed on an inner portion of the cover 1, adapted to be fastened on a valve stem of the inflator.

I claim:

1. An inflator cap comprising:

an outer cover;

an anti-corrosion lining made of corrosion resistant material and lined or formed inside said outer cover, adapted to be unscrewably fastened on a valve stem of a vehicle inflator; and a magnetic member formed on, in or inside said outer cover, adapted to be magnetically attractable or holdable on a ferromagnetic object to prevent from loss of the inflator cap once unscrewed from the inflator, said magnetic member including a magnetic adhesive element fastened in between a lower rim portion of said outer cover and a lower periphery of said anti-corrosion lining.

2. An inflator cap according to claim 1, wherein said magnetic adhesive element includes magnetic powders or ingredients incorporated therein to provide magnetism of said inflator cap to be magnetically attractable on a ferromagnetic object.

* * * * *